United States Patent [19]

Howard et al.

[11] 3,973,936
[45] Aug. 10, 1976

[54] HORSESHOE-SHAPED VACUUM CLEANER FILTER BAG

[76] Inventors: Sol Howard, 15 Wenwood Drive, Brookville, N.Y. 11554; Robert Schaaf, 97-07 99th Ave., Ozone Park, N.Y. 11416

[22] Filed: Jan. 28, 1975

[21] Appl. No.: 544,804

[52] U.S. Cl. ................................ 55/363; 55/368; 55/370; 55/376; 55/380; 55/382; 55/DIG. 2
[51] Int. Cl.² ........................................ B01D 46/02
[58] Field of Search ............... 55/363, 368–371, 55/380–382, DIG. 2, 376; 15/327 R, 352, 353; 229/53, 55, 62

[56] References Cited
UNITED STATES PATENTS

| | | | |
|---|---|---|---|
| 2,298,419 | 10/1942 | Salfisberg | 229/53 |
| 2,520,877 | 8/1950 | Cavanagh | 55/370 X |
| 2,528,375 | 10/1950 | Lilly | 55/363 X |
| 2,637,410 | 5/1953 | Martin et al. | 55/369 X |
| 2,732,911 | 1/1956 | Gall | 55/368 |
| 2,792,076 | 5/1957 | Meyerhoefer | 55/368 X |
| 2,848,062 | 8/1958 | Meyerhoefer | 55/368 X |
| 2,848,063 | 8/1958 | Meyerhoefer | 55/368 |
| 2,870,863 | 1/1959 | Bramhall | 55/363 X |
| 2,905,267 | 9/1959 | Thompson | 15/327 R |
| 3,297,231 | 1/1967 | Fesco | 55/381 X |
| 3,350,857 | 11/1967 | Fesco | 55/376 X |
| 3,452,520 | 7/1969 | Fesco | 55/368 X |
| 3,480,987 | 12/1969 | Schaefer | 15/327 R X |
| 3,619,989 | 11/1971 | Howard et al. | 55/368 |
| 3,755,993 | 9/1973 | Cote | 55/381 X |

FOREIGN PATENTS OR APPLICATIONS
408,501   4/1934   United Kingdom .................. 55/369

*Primary Examiner*—Frank W. Lutter
*Assistant Examiner*—Kathleen J. Prunner
*Attorney, Agent, or Firm*—Friedman & Goodman

[57] ABSTRACT

A vacuum cleaner filter bag is made of a porous sheet of material which permits penetration and flow therethrough of air. The bag is generally horseshoe-shaped and has a comparably shaped internal cavity. The bag has two tubular leg portions and a tubular connecting portion between the leg portions. An air inlet opening is provided on the connecting portion for admitting a stream of air under pressure into the cavity and an opening, which permits removal of accumulated debris but which is closed during use of the bag, is also provided on the connecting portion. The air flow between the air inlet opening on the vacuum cleaner housing and the inlet opening of an exhaust motor situated within the vacuum cleaner housing generally tends to primarily penetrate or flow through a wall portion of the bag disposed between the respective inlet air openings. An air impervious blocking sheet of material, such as a sheet of vinyl or acetate, is provided on the wall portion to prevent passage of the air therethrough and to thereby prevent accumulation of debris in the bag connecting portion. This assures flow of air into the leg portions of the bag and a more uniform distribution and accumulation of debris throughout the cavity of the bag.

9 Claims, 6 Drawing Figures

HORSESHOE-SHAPED VACUUM CLEANER FILTER BAG

BACKGROUND OF THE INVENTION

The present invention generally relates to vacuum cleaner bags, and more specifically to a horseshoe-shaped vacuum cleaner bag at least a wall portion of which is reenforced with air blocking means to prevent passage of air which has a tendency to penetrate the particular wall portion of the bag to thereby result in excessive accumulation of debris in one part of the bag only and uneven distribution of debris throughout the internal cavity thereof.

One class of vacuum cleaners include a generally cylindrical canister or housing having a bag receiving cavity therein. An inlet opening is provided in the housing to which a vacuum hose may be attached by suitable connecting means. An exhaust motor is disposed within the cavity, generally centrally thereof, the motor being provided with an air inlet opening and an air outlet opening which communicates with the outside of the canister. In the use of such vacuum cleaners, actuation of the motor causes a rapid flow of air from the interior of the cavity or housing into the motor air inlet opening, such air being expelled to the exterior or outside of the vacuum cleaner housing. A continuous supply of air is provided which enters through a housing inlet opening. This air, which carries dust, small particles and other debric, is caused to enter a vacuum cleaner bag, which expands from its generally collapsed condition when the vacuum cleaner motor is inoperative. Being made of a porous sheet of material which permits the penetration of air therethrough, the air which enters the vacuum cleaner bag passes through the wall material and into the cavity, from which it is drawn into the motor. Clearly, the vacuum cleaner bag material acts as a filter which retains the debris while permitting the air to pass therethrough to be expelled outside of the unit.

The tendency of the air flow is to take the most direct and shortest route between the housing inlet opening and the motor inlet opening. When the vacuum cleaner bag extends further or beyond the motor inlet opening, it frequently occurs that the debris primarily accumulates in the region between the housing and motor inlet openings and the more remote parts of the bag remain substantially unfilled.

SUMMARY OF THE INVENTION

Accordingly, it is an object of the present invention to provide a vacuum cleaner filter bag which does not have the above disadvantages associated with prior art bags.

It is another object of the present invention to provide a vacuum cleaner filter bag which is simple in construction and economical to manufacture.

It is still another object of the present invention to provide a vacuum cleaner filter bag which may be utilized with canister-type vacuum cleaners and which provides more uniform accumulation of debris therein.

It is yet another object of the present invention to provide a vacuum cleaner filter bag of the type under discussion which includes air blocking means for preventing the natural tendency of flow of air from a canister inlet opening to an exhaust motor inlet opening through an intermediate filter bag wall portion, thus increasing movement of air into the more remote parts of the filter bag.

It is a further object of the present invention to provide a vacuum cleaner filter bag of the type under consideration which includes an opening which is normally closed during use by a suitable clamp or the like and which can be opened to provide a relatively large access opening to the interior of the filter bag so that the debris accumulated therein may be easily removed for reuse of the bag.

In order to achieve the above objects, as well as others which will become apparent hereafter, the vacuum cleaner filter bag in accordance with the present invention comprises a porous sheet of material which permits the penetration and flow therethrough of air. Said sheet of material generally forms a continuous wall and defines a horseshoe-shaped cavity including two tubular leg portions and a tubular connecting portion between said leg portions. Air inlet means are provided on said connecting portion for admitting a stream of air under pressure into said cavity. The air tends to impinge on inner surface portions of said connecting portion. Air impervious blocking means is provided on at least a part of said inner surface portions to decrease the overall porosity in the region of said connecting portion sheet material. In this manner, the velocity of air flow into said cavity is not materially dissipated by passage or penetration through said connecting portion. In this manner, passage of the air and the debris carried thereby into said leg portions is assured.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENT

Figure 1:
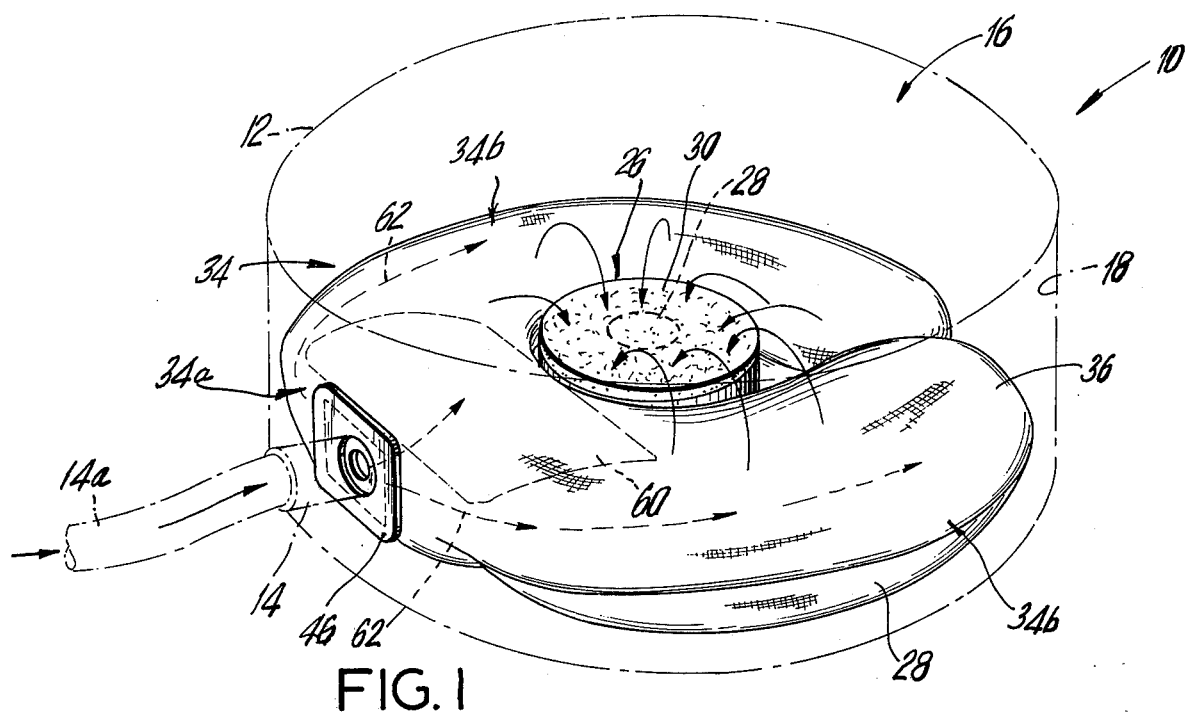
FIG. 1 is a perspective view of a vacuum cleaner filter bag in accordance with the present invention, shown in a vacuum cleaner canister of the type including a generally centrally located exhaust motor.
Figure 2:
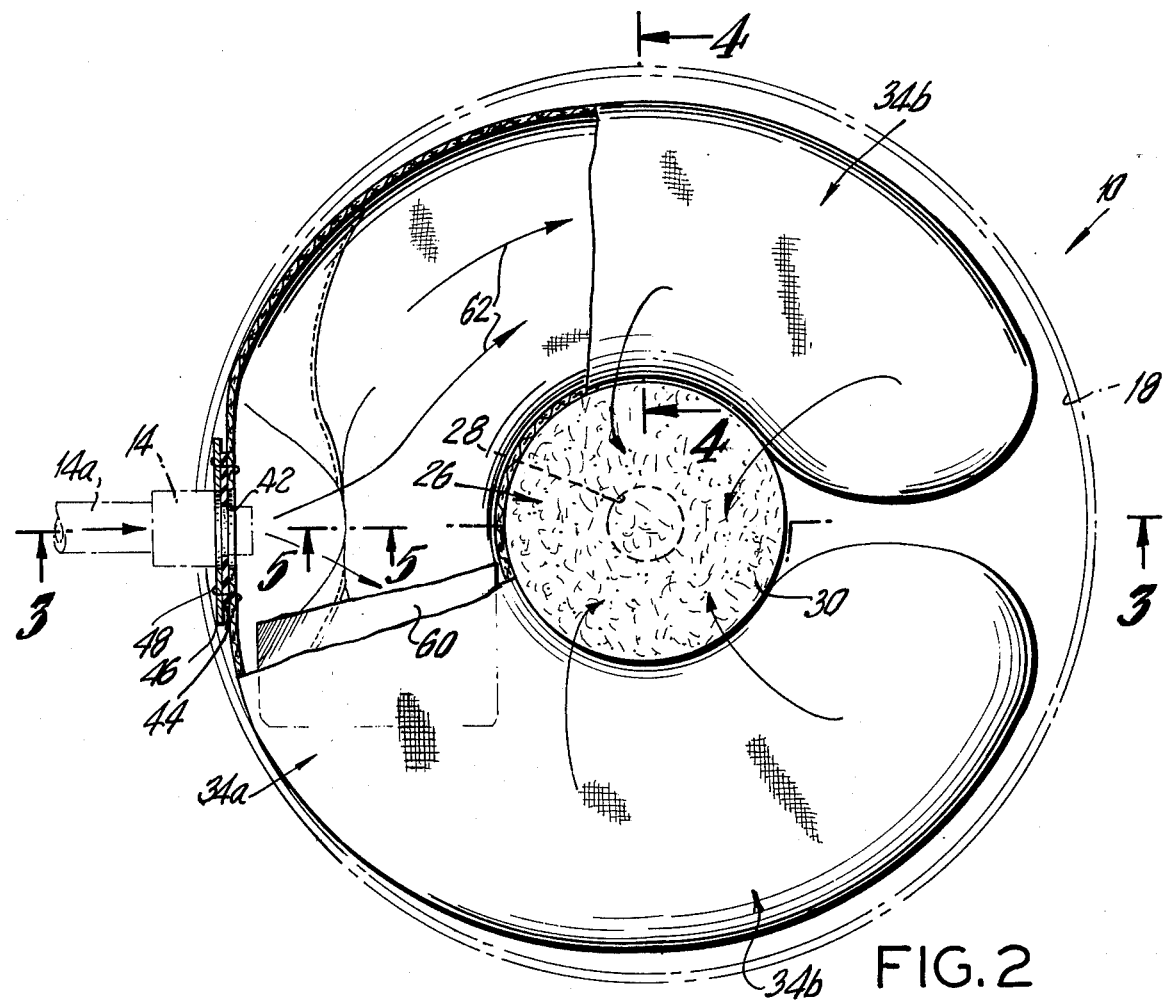
FIG. 2 is a top plan view of the arrangement shown in FIG. 1, with a portion of the bag broken away to expose the bag cavity as well as the sheet of plastic which limits the penetration and flow of air through the front upper portion of the filter bag.

Referring now to the Figures, wherein identical or similar parts have been designated by the same reference numerals throughout, and first referring to FIGS. 1–4, the vacuum cleaner of the type which utilizes vacuum cleaner bags in accordance with the present invention is generally indicated by the reference numeral 10.

The vacuum cleaner 10 is shown to include a generally cylindrical canister or housing 12, in dashed outline in FIG. 1, which includes an air inlet opening in the form of a hose mount 14, and which defines a generally cylindrical chamber 16.

Figure 3:
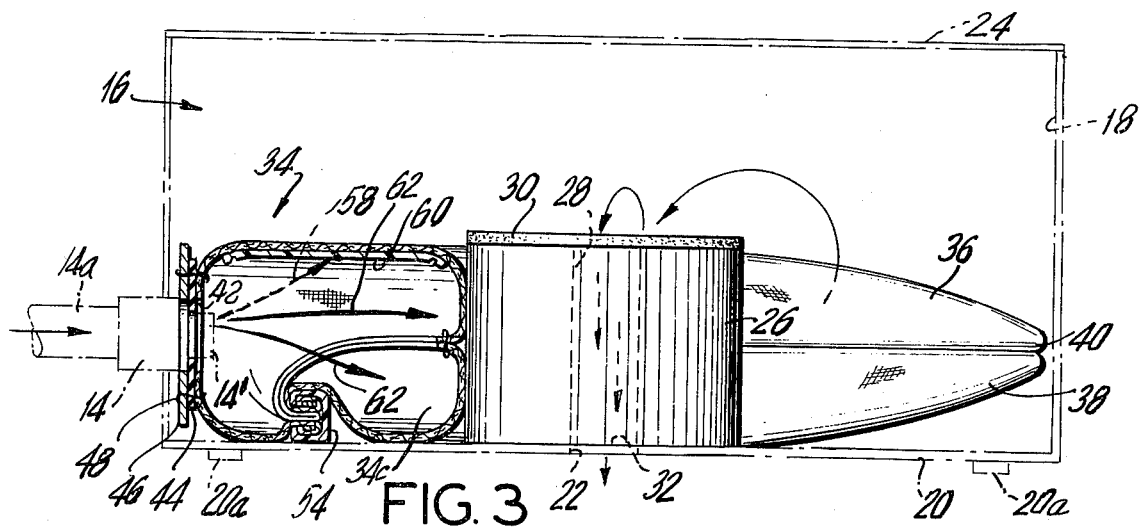
FIG. 3 is a side elevational view of the arrangement shown in FIGS. 1 and 2, with the air inlet portion of the bag being shown in cross section, taken along line 3—3 in FIG. 2, to show the manner in which the bag is generally situated within the canister and the air flow through the bag.
Figure 4:
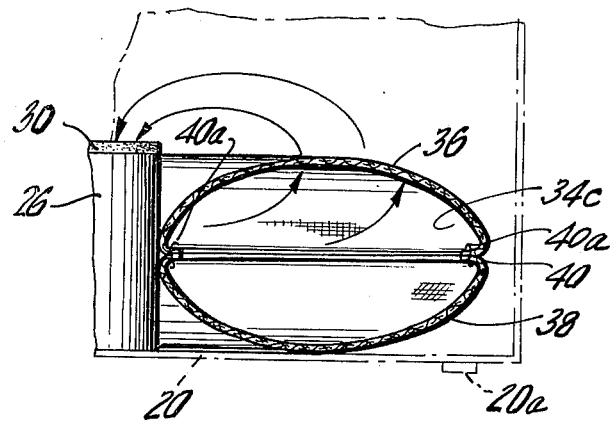
FIG. 4 is similar to FIG. 3 and is a cross-sectional view of the bag, taken along line 4—4 in FIG. 2, when the same is inflated and shows the general patterns of flow of air in that region of the bag.

The canister 12 typically includes a lateral wall 18, a bottom wall 20 provided with an air outlet opening 22, as shown in FIG. 3, and a top wall or cover 24 which is generally removable to provide access to the canister. The bottom wall 20 is normally provided with legs or spacers 20a which raise the bottom wall 20 above the surface on which the canister is supported to facilitate the expulsion of air from the canister, as to be described.

Disposed within the canister 12 is an exhaust motor 26. While the general position of the motor within the canister is not critical, the motor 26 is generally disposed centrally in the chamber 16.

The motor 26 is of a type commonly used for this purpose and has an upper inlet opening 28, as viewed in the Figures, covered by a filter 30, made of any suitable filtering material. The air outlet opening 32 of the motor 30 may be situated in proximity to the air outlet 22 of the housing so that the stream of air which flows through the motor may be readily expelled from the interior of the housing to the exterior thereof.

The bag in accordance with the present invention, intended to be used with the above described vacuum cleaner device 10, is a horseshoe-shaped bag designated by the reference numeral 34. The bag 34 is made of porous sheets of material which permit the penetration and flow therethrough of air. For example, a woven fabric may be utilized for this purpose.

The sheets of material from which the bag 34 is made form a tubular connecting portion 34a and two tubular leg portions 34b which together define a horseshoe-shaped cavity 34c.

While this is not a critical feature, the porous sheets of material or wall which form the horseshoe-shaped bag 34 are made of two substantially identical horseshoe-shaped planar sheets 36 and 38 the peripheral edges of which are connected, such as at seam 40, by any suitable means. For example, such planar sheets 36 and 38 may be joined by the use of adhesive, stitching or the like.

The bag 34 is provided with air inlet means at the intermediate portion of the sheet 36 as shown, the air inlet including an aperture or hole 42, a flexible resilient seal 44 mounted on a rigid cardboard backing 46. Stitches 48 connect the sheet 36 and the seal 44 to the rigid cardboard or other backing 46.

The hose mount 14 is suitable for being connected to a vacuum cleaner hose 14a at the exterior of the canister 12 and includes a projection 14' having suitable radial dimensions to be received within the aperture or opening 42 of the vacuum cleaner bag 34. The seal 44, in accordance with common practice, has an opening dimensioned slightly smaller than the hole 42 to sealingly grip the projection 14' and to insure that a good seal is provided at the vacuum cleaner bag air inlet opening.

Figure 5:
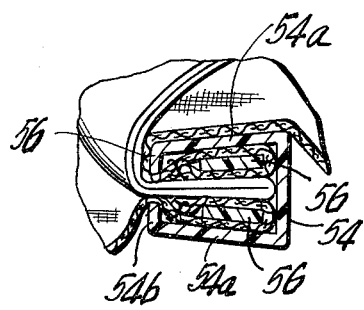
FIG. 5 is a cross-sectional view, taken along line 5—5 in FIG. 2, showing the details of the debris removal opening and the clamp shown in FIG. 3 and the manner in which the latter maintains the opening of the bag closed during normal use.
Figure 6:
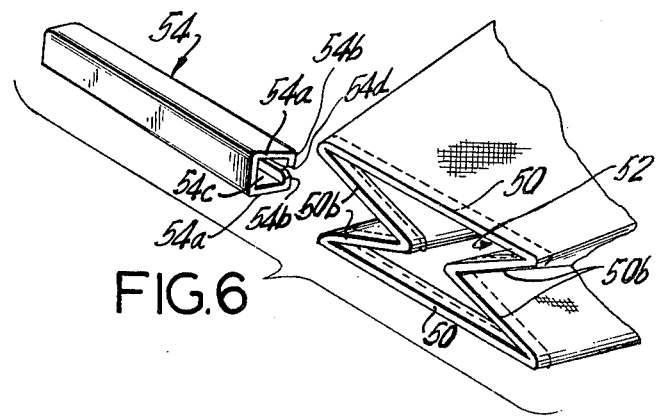
FIG. 6 suggests the manner in which the bag can be pleated and inserted within the clamp of FIG. 5 after the bag has been emptied of debris.

With reference to FIGS. 3, 5 and 6, the vacuum cleaner bag is provided with a further, substantially larger, opening 52 defined by the edge portions 50 of the sheets 36 and 38. While the stitching 40a, best shown in FIG. 4, joins the sheets 36 and 38 at the joint or seam 40 along almost all the portions of the peripheral edges of the two sheets, the edge portions 50 remain unattached to define a substantially large opening 52 through which debris may be expelled from the cavity 34c.

A clamp or other suitable means 54 is provided for clamping the unattached peripheral edge portions 50 for the purpose of closing the opening 52 during use of the bag. Thus, the only opening in the bag 34 during use is the air inlet opening 42. The clamp 54 may be removed to expose the opening 52 to permit removal of accumulated debris within the bag 34.

According to one presently preferred embodiment, the clamp 54 is in the form of an elongate resilient substantially U-shaped member 54 having two opposing legs 54a having substantially parallel facing surfaces. The peripheral edge portions 50 advantageously are longer in length than the length of the resilient member 54. In this manner, the planar sheets may be pleated as shown to form edges 50b in the region of the opening 52 to establish a thickness of material somewhat greater than the spacing between the parallel surfaces of the legs 54a to be received therebetween in pressure relation to maintain the opening 52 closed.

The legs 54a are advantageously provided with opposing lips 54b at the free edges thereof as shown. Each lip 54b extends in the direction of the other lip to form a substantially open channel 54c having open ends and a groove 54d between the lips 54b. When used with such lips, the bag is advantageously further provided with elongate stiffening means 56, as shown in FIGS. 3 and 5, provided along the peripheral edge portions 50 which are receivable within the channel 54c through one of the open ends. The stiffening members 56 have a collective thickness when the sheets are pleated as shown in FIG. 6 greater than the width of the groove 54d to prevent separation of the clamp 54 from the bag to expose the opening 52.

To achieve pleating as shown in FIG. 6, it is necessary that each unpleated section of the stiffening means 56 be generally resistive to flexing and deformation but also that each section be connected to each other with joints or breaks therein to facilitate pleating of the planar sheets of material.

As best shown in FIG. 3, actuation of the motor 26 creates substantial suction at the inlet opening 28 of the motor which causes substantial flow of air from the interior of the chamber 16 into the opening 28. Since the canister is generally sealed and the only source for the admission of air into the canister is through the hose mount 14, a suction develops which causes air to be drawn in through the hose mount 14 by way of the hose 14a. The air which enters the canister 12 is forced into the bag 34. The motor 26 thereby expands or blows up the bag 34 from its normally collapsed condition. The air within the bag is now drawn through the porous walls thereof to enter the canister chamber 16 and subsequently drawn into the motor opening 28 through the filter 30 to be expelled as described above.

As should be clear from FIG. 3, the tendency of air flow with conventional bags would be as indicated by the dashed arrow 58. This air would normally penetrate and flow through the upper wall portion of the bag which is intermediate the hose mount 14 and the motor inlet opening 28. This represents the shortest and most direct route for the air flow. In fact, if the bag 34 were to be removed, the air would primarily flow from the mount 14 almost directly to the motor inlet opening 28 and subsequently be expelled outside of the canister. Minimal amounts of air would flow in other regions or areas of the canister chamber 16.

As should be clear, the air which enters through the hose 14a carries dust, small particles and other debris. It is by passage through the filter wall that the air is cleaned and the debris is removed or filtered out and retained within the bag. However, since the flow patterns of the air within the bag determine the ultimate distribution of the debris therein, it is important to insure that air movements take place throughout the horseshoe-shaped bag and not only in the region of the intermediate wall portion 34a of the bag situated between the air inlet openings described above.

As should be clear, with conventional bags permitting the flow of air as indicated by the arrow 58, a substantial part of the incoming air penetrates and flows through the upper intermediate wall portion of the bag between the air inlet openings and excessively rapid accumulation of debris takes place in the region of the air inlet opening 42. However, since little air is forced into the leg portions 34b of the bag, there is little accumulation in those regions. Therefore, the full utilization of the bag does not take place and the bag must be emptied more frequently in order to remove the blockage of debris at the air inlet opening 42.

Accordingly, an important feature of the present invention is the provision of an impervious blocking means, in the nature of a generally flexible impervious sheet of material 60 provided on the intermediate portion of the vacuum cleaner bag where the air has the greatest tendency to pass to decrease the overall porosity in the region in question. In this manner, the air flow 58 is substantially eliminated and the air coming into the bag is urged or forced to flow beyond the intermediate connecting portion 34a and into the leg portions 34b. The impermeable sheet 60, by preventing passage of air therethrough, assures that the flow velocity of the air in the leg portions 34 is not materially decreased from the initial entry velocity into the bag. This also assures that the debris carrying air is forced into the leg portions 34, where the debris is deposited.

The vacuum cleaner bag may generally be described as defining two planes of symmetry. A longitudinal first plane of symmetry extends through the tubular and leg portions 34b and 34a, and generally extends through the joint or seam 40. As shown in the Figures, the portion of the filter bag most proximate to the openings 42 and 28 is on planar sheet 36 above the longitudinal plane of symmetry. It is therefore on the sheet 36 above the longitudinal plane of symmetry and between the openings 14 and 28 that the impervious blocking sheet 50 is provided. The sheet 60 advantageously lines the entire width of the connecting portion 34a extending between the lateral wall on which the hose mount 14 is provided and the motor 26. The specific nature of the sheet 60 is not critical. Flexible plastic materials such as acetate or vinyl may be utilized for this purpose. Where a soft sheet of flexible plastic material is utilized, the sheet may be fastened to the upper planar sheet 36 of the bag by heat sealing the peripheral edges to the porous material from which the bag is formed.

A second transverse plane of symmetry only extends through the connecting portion 34a and is normal to the longitudinal plane. The leg portions 34b are symmetrically disposed on opposite sides of the transverse plane of symmetry. The sheet 60, as suggested above, advantageously extends substantially along the entire width of the connecting portion 34a along the transverse plane of symmetry.

An advantageous characteristic of the blocking sheet 60 is that it be in the form of a smooth sheet of non-abrasive material. In this manner, impingement of air as it enters the bag, as well as impingement of the debris on the plastic sheet, does not substantially decrease the velocity of flow of the air and debris and sufficient velocity of air flow is assured for causing substantial amounts of air to flow into the leg portions 34b.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A vacuum cleaner filter bag comprising first and second substantially identical horseshoe-shaped planar sheets of porous material which permit air to penetrate and flow therethrough, connecting means for connecting peripheral edges of said sheets to provide two tubular leg portions and a tubular connecting portion between said leg portions to define a continuous wall enclosing a horseshoe-shaped cavity, said connecting means being disposed along a longitudinal plane of symmetry extending through said tubular leg and connecting portions, said tubular leg portions being generally identical and symmetrically disposed on opposite sides of a transverse plane of symmetry extending through said tubular connecting portion, air inlet means provided on said tubular connecting portion in said first sheet of porous material for admitting a stream of air under pressure into said cavity, the stream of air generally impinging on an inner surface portion of said first sheet of porous material disposed within said tubular connecting portion, said inner surface portion being disposed on each side of said transverse plane of symmetry and on only one side of said longitudinal plane of symmetry in a position between said air inlet means and said tubular leg portions, air impervious blocking means for directing the stream of air and debris carried thereby into said tubular leg portions, said air impervious blocking means being provided on said inner surface portion to decrease overall porosity at said inner surface portion so that the stream of air is not materially dissipated by passage and penetration through said tubular connecting portion, said air impervious blocking means including a planar smooth sheet of flexible non-abrasive plastic material covering said inner surface portion, fastening means for securing said flexible plastic sheet material to said inner surface portion, opening means disposed in said tubular connecting portion to provide an opening through which the debris may be expelled from said cavity, said opening means being defined by peripheral end portions of said first and second sheets, said end portions being disposed along said longitudinal plane of symmetry and spaced from said flexible plastic sheet by said air inlet means, and closure means for securing said end portions together to close said opening means during use of said filter bag and for permitting said end portions to be separated from each other to open said opening means for removal of accumulated debris from within said cavity.

2. A vacuum cleaner filter bag as defined in claim 1, wherein said sheets of porous material comprise a cloth material.

3. A vacuum cleaner filter bag as defined in claim 1, wherein said connecting means comprises stitching.

4. A vacuum cleaner filter bag as defined in claim 1, wherein said flexible plastic material comprises a sheet of acetate.

5. A vacuum cleaner filter bag as defined in claim 1, wherein said flexible plastic material comprises a sheet of vinyl.

6. A vacuum cleaner filter bag as defined in claim 1, wherein said fastening means comprises a heat seal extending about a peripheral edge of said plastic flexible sheet.

7. A vacuum cleaner filter bag as defined in claim 1, wherein said closure means comprises an elongate resilient substantially U-shaped member having two opposing legs having substantially parallel facing surfaces to permit said end portions to be received between said legs in pressure relation to maintain said opening means closed.

8. A vacuum cleaner filter bag as defined in claim 7, wherein said legs are provided with opposing lips at free edges thereof, each lip extending in the direction of the other lip to form a substantially open channel having open ends and a groove between said lips; and further comprising elongate stiffening means provided along said peripheral end portions which are receivable within said channel through one of said open ends to prevent separation of said U-shaped member from the bag.

9. A vacuum cleaner filter bag as defined in claim 8, wherein sections of said stiffening means are resistive to flexing and deformation.

* * * * *